United States Patent [19]

de Zoeten et al.

[11] Patent Number: 4,747,647
[45] Date of Patent: May 31, 1988

[54] OPTICAL SCANNING DEVICE

[75] Inventors: Peter de Zoeten; Albert Smid, both of Eindhoven, Netherlands

[73] Assignee: U.S. Philips Corp., New York, N.Y.

[21] Appl. No.: 875,418

[22] Filed: Jun. 17, 1986

[30] Foreign Application Priority Data

Jun. 24, 1985 [NL] Netherlands ............... 8501805

[51] Int. Cl.$^4$ ................. G02B 26/10; H01J 3/14
[52] U.S. Cl. ........................................ 350/6.8
[58] Field of Search ............ 350/6.5, 6.6, 6.7, 6.8, 350/6.9, 6.91; 250/235, 236; 358/206

[56] References Cited

U.S. PATENT DOCUMENTS

| | | | |
|---|---|---|---|
| 3,787,107 | 1/1974 | Sick et al. | 350/6.8 |
| 3,817,593 | 6/1974 | Harris et al. | 350/6.9 |
| 3,909,105 | 9/1975 | Neiswander et al. | 350/6.6 |
| 4,019,804 | 4/1977 | Collier | 350/6.8 |
| 4,106,845 | 8/1978 | Moore et al. | 350/6.8 |
| 4,496,209 | 1/1985 | Itoh et al. | 350/6.8 |
| 4,508,422 | 4/1985 | Karlsson | 350/6.8 |
| 4,519,680 | 5/1985 | Grollimund | 350/6.7 |
| 4,585,296 | 4/1986 | Minoura et al. | 350/6.8 |

FOREIGN PATENT DOCUMENTS

| | | | |
|---|---|---|---|
| 0018787 | 11/1980 | European Pat. Off. | 350/6.8 |
| 1287280 | 8/1972 | United Kingdom . | |
| 1490092 | 10/1977 | United Kingdom . | |
| 2023872 | 1/1980 | United Kingdom | 350/6.8 |
| 2073537 | 10/1981 | United Kingdom | 350/6.8 |
| 1053058 | 11/1983 | U.S.S.R. | 350/6.8 |

OTHER PUBLICATIONS

IBM Journal of Reasearch and Development, vol. 21, No. 5, Sep. 1977, "Laser-Optical System of the 3800 Printer", by Fleischer et al., pp. 480-483.

*Primary Examiner*—John K. Corbin
*Assistant Examiner*—Ronald M. Kachmarik
*Attorney, Agent, or Firm*—William L. Botjer

[57] ABSTRACT

A scanning device is described which comprises a rotationally symmetrical rotating reflecting facet disc (3) in which a scanning beam (2, 2') is focussed on a face (5, 6) of the facet elements (4). The sensitivity of the device to surface defects or dust particles on the faces of the facet elements can be reduced by means of a first astigmatic element (20) which widens the beam (2') issuing from the detector (10) at the location of the facet disc in a direction transverse to the scanning direction (18), while a second astigmatic element (21) cancels the astigmatism of the first element.

13 Claims, 3 Drawing Sheets

OPTICAL SCANNING DEVICE

BACKGROUND OF THE INVENTION

The invention relates to an optical scanning device comprising an objective system, a rotationally symmetrically rotating reflector body comprising a plurality of reflector elements each comprising two plane reflector faces which are disposed at an angle of substantially 90° to one another and which intersect each other along a line transverse to the direction of rotation of the reflector body, a radiation-sensitive detection system arranged in the path of the radiation reflected by the reflector body, and an imaging system arranged between the detection system and the reflector body for imaging a point of the detection system and a fixed point in the proximity of the reflector body onto one another.

The imaging system may comprise one lens element or a plurality of lens elements and is also referred to as "relay lens". The point in which a point of the detection system is imaged by the imaging system may be situated inside a reflector element but also outside such an element in the vicinity of the reflector body. These possibilities are referred by the expression: "in the proximity of the reflector body". The detection system may comprise a single detector but alternatively a plurality of detectors arranged in line.

Such a device is disclosed in British Patent Specification No. 1,287,280. The known device comprises a rotating disc which at its circumference carries a plurality of roof mirrors or facet mirrors each comprising two reflecting faces disposed at an angle of 90° to one another. The scene to be scanned or the object to be scanned is imaged in the proximity of the disc by the objective system and the roof mirrors reflect the radiation of the scanning beam to a radiation-sensitive detection system comprising a single detector.

The operation of scanning devices of this type is generally described starting from the detection system and following the radiation path from this system back into the space to be scanned or object space. This method will also be adopted in the following description. In the reverse radiation path between the reflector disc and the detector a lens is arranged which images the detector in a fixed point of a curved surface through the apexes of the roof mirrors. During rotation of the reflector disc a scene is scanned along a line, for example, a horizontal line. Scanning in a second direction, for example the vertical direction, can be effected by means of a plurality of detectors arranged along a line parallel to the axis of rotation of the reflector disc.

In comparison with other scanning bodies, such as a rotating transparent prism or a drum whose outer circumference carries a plurality of single mirors, the use of a disc with roof mirrors, also referred to as facet disc, in a scanning device has the advantage that this device does not have a "dead time", i.e. there is no time interval between the instant at which scanning along a first line terminates and the instant at which scanning along a second line begins. When this scanning device is employed in a thermal imaging or infrared camera, in which a cold shield is arranged before the detector, another advantage of the facet disc is that the beam of useful radiation reaching the detector is stationary in space, so that the aperture in the cold shield can be small, which ensures that the background radiation which is incident on the detector is minimal.

As the imaginary beam issuing from the detector is focussed in a point near the reflector faces, this beam will have a small cross-sectional area at the location where it is incident on a first face of reflector element. Conversely, the scanning beam issuing from the scene or the object which is incident on the first face via the second face of the same reflector element will have an equally small cross-sectional area. This means that small disturbances in surface of the first reflector face, in the form of scratches or pits, or dust particles on this surface, will have a comparatively large influence on the radiation intensity of the scanning beam and hence on the signal supplied by the detector. When the scanning device is employed in an infrared camera said disturbances not only reduce the amount of useful infrared radiation incident on the detector but these disturbances themselves also emit infrared radiation to the detector. In the visible image of the infrared scene these disturbances may appear as specks, in particular if the actual picture is uniform.

SUMMARY OF THE INVENTION

It is the object of the invention to provide a scanning device of the type defined in the opening paragraph which mitigates this drawback. To this end the scanning device is characterized in that a first astigmatic element is arranged in the radiation path between the detection system and the reflector body and a second astigmatic element is arranged in the radiation path from the reflector body up to and including the objective system to correct for the astigmatism of the first astigmatic element.

The first astigmatic element ensures that the detection system receives a beam issuing from an elongate strip of a reflector face, so that local surface defects are averaged out over the length of the strip, whilst in the scanning direction the point-by-point imaging is maintained. The second astigmatic element restores the orginal divergence of the scanning beam to the scanning space.

The first astigmatic element may comprise an optical element which is alrady prsent in the radiation path between the detection system and the reflector body and which is made astigmatic especially for the present purpose. This optical element is for example a lens element of the imaging system, or relay lens, or for example a radiation-path folding mirror which is made spherical and which has an astigmatic effect because it is arranged obliquely in the beam. The second astigmatic element may comprise, for example, such a spherical folding mirror in the radiation path between the reflector body and the objective system, or for example a lens element of the objective syste. However, a preferred embodiment of the invention is characterized further in that the first and the second astigmatic element each comprises a cylindrical lens whose cylinder axis extends transversely of the scanning direction. Such cylindrical lenses are highly astigmatic and are therefore very suitable for the present purpose.

It is to noted that British Patent Specification No. 1,490,092 describes a scanning device for inscribing a medium by means of a light spot, in which device a first cylindrical lens and a second cylindrical lens are arranged before and behind a rotating reflector body. However, in said device the reflector body is a mirror polygon, i.e. a rotationally symmetrical body which on its periphery carries a plurality of single mirrors which make an angle which is significantly smaller than 90° with one another, and not a disc with mirror elements comprising two mirrors each. The first cylindrical lens in the known device serves to expand the scanning beam in the scanning direction in order to ensure that this beam is incident on at least two mirrors at the same time and not to expand the beam in a direction transverse to the scanning direction. The second cylindrical lens in the known device serves to correct the tilts of the mirror polygon relative to its axis of rotation and/or an incorrect orientation of the mirrors, and not to correct for the astigmatism of the first cylindrical lens.

A preferred embodiment of the invention may be characterized further in that the positions and lens powers of the two cylindrical lenses are such that between these lenses the beam is a parallel beam, viewed in a direction transverse to the scanning direction. The advantage of this embodiment is that the axial positions of the cylindrical lenses relative to one another are noncritical.

BRIEF DESCRIPTION OF THE DRAWING

An embodiment of the invention will now be described in more detail, by way of example, with reference to the accompanying drawings. In the drawings.

DESCRIPTION OF THE PREFERRED EMBODIMENTS

Figure 1:
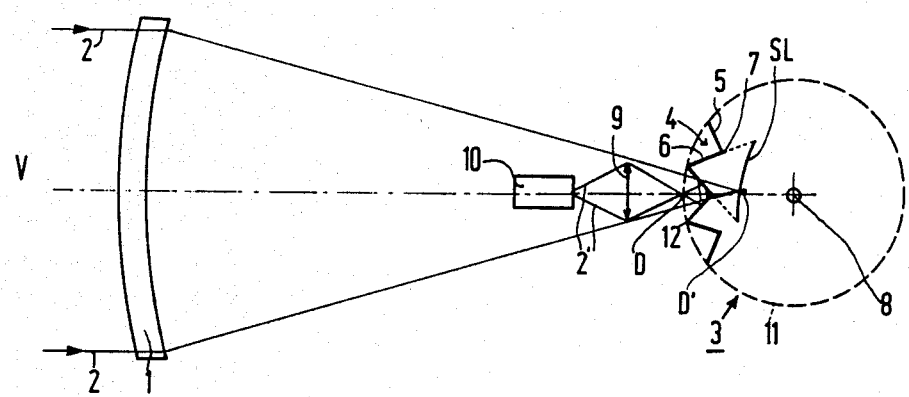
FIG. 1 shows schematically a one-dimensional scanning device comprising a facet disc.

FIG. 1 illustrates the general principle of the scanning device comprising a facet disc. This Figure shows schematically an objective system 1 which focusses the scanning beam 2 issuing from the object space V at the left of the drawing in a point in the proximity of a reflecting face of the disc 3. This disc, which is shown in a sectional view along a plane transverse to the axis of rotation 8, comprises a plurality of facet mirrors 4, for example 25 or 50, each comprising two reflecting faces 5 and 6 which intersect one another along a line 7 parallel to the axis of rotation 8 and hence perpendicular to the plane of drawing in FIG. 1.

The element 9 is an imaging or relay lens and 10 is a radiation-sensitive detection system which may comprise a single detector or a linear detector array. The lens 9 images the detector 10 in a point D situated on an imaginary cylindrical surface whose cylinder axis is the axis of rotation 8 of the disc 3. In order to simplify the drawing it is assumed that point D is situated on the outer circumference 11 of the disc 3. In reality point D will generally be situated between the vertices 7 and 12. Point D may alternatively be situated slightly beyond the vertices 12 or 7. The imaginary beam 2' issuing from the detector 10 is reflected by a facet mirror 4 and then virtually issues from a point D', the virtual image point of D. As the disc 11 rotates point D' travels along a vertual curve, the scanning line SL, so that the detector 10 scans a line in the object space V.

Figure 2:
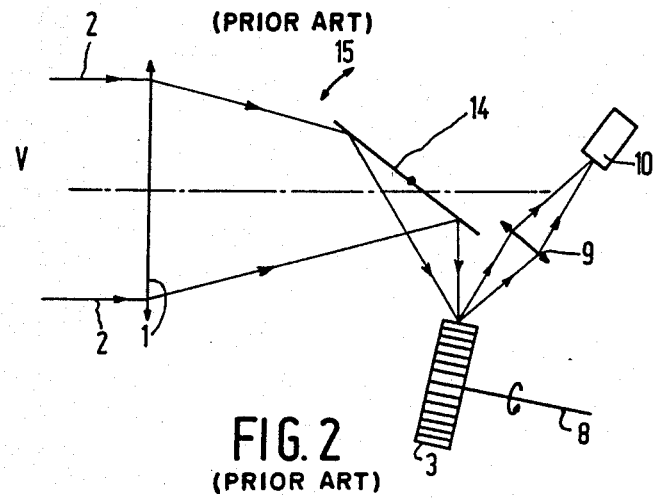
FIG. 2 shows schematically a two-dimensional scanning device comprising a facet disc.

FIG. 2 shows a scanning device in a two-dimensional embodiment. In this Figure the facet disc 3 is shown in side view. The axis of rotation 8 of the disc is situated in the plane of drawing. This disc provides the scanning in a horizontal direction transverse to the plane of drawing of FIG. 2. Scanning in a second, for example vertical, direction is effected by means of a mirror 14 which is oscillated as indicated by the arrow 15. Instead of the use of the mirror 14 in combination with one detector for scanning in the second direction, it is possible to use a plurality of detectors which are arranged along a line transverse to the second scanning direction. The number of detectors may be equal to the number of lines to be scanned. Alternatively, the detection system may comprise a small number of detectors, for example five, so that a small number of lines is scanned simultaneously. The device should then comprise a scanning mirror 14 for complete scanning in the second direction.

Figure 3:
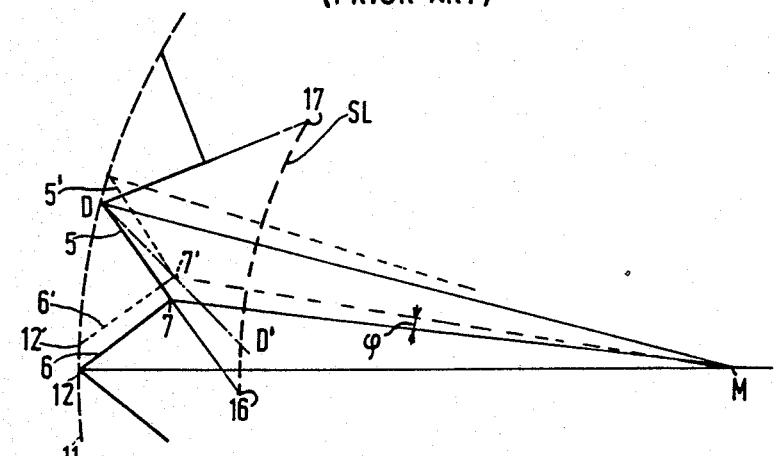
FIG. 3 illustrates the operation of the facet disc.

FIG. 3 illustrates the scanning by a facet mirror of the disc whose centre is M. The solid lines 5 and 6 denote the initial position of the disc, whilst the broken lins 5' and 6' indicate the position of the relevant facet mirror after rotation of the disc through an angle $\phi$. After rotation through an angle $X=360°/N$, where N is the number of facet mirrors of the disc, the initial position is reached again.

D is again the image of the detector 10 formed by an imaginary beam issuing from the detector. After reflection from the faces 5' and 6' the beam appears to be issuing from point D'. The image D' of D formed by the faces 5' and 6' may therefore be regarded as a mirror inversion of point D relative to point 7'. Point D is a fixed point. As the facet disc rotates point 7' describes an arc of circle and the image D' travels along the curve SL, also referred to as the scanning line. During rotation of the facet disc through the angle X the image D' follows the entire curve SL between points 16 and 17. As the disc 3 is rotated further the scanning line SL is followed again.

The image point D' of the detector 10 is re-imaged in the object space by the other elements, the objective lens 1 of FIG. 1 and, as the case may be, the mirror 14 shown in FIG. 2. During rotation of the facet disc this re-imaged point describes a curve. From the detector the points where this curve terminates are viewed at a specific angle, referred to as the viewing angle. The magnitude of the viewing angle is dictated by the length of the curve SL, i.e. by the distance between points 16 and 17.

Figure 4:
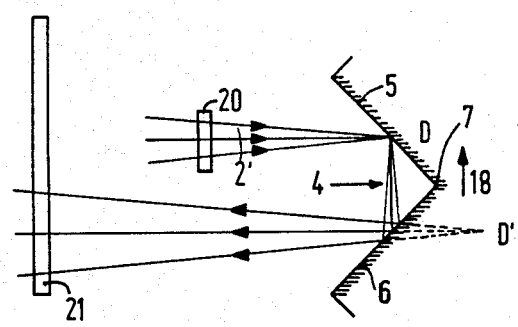
FIGS. 4, 5, and 9 illustrate the inventive principle.

Since the detector 10 is always imaged in a point on or in a facet mirror the beam issuing from the detector always has a small cross-sectional area at the location where it is incident on one of the faces 5 or 6 of the facet mirror. This is illustrated in FIG. 4, which is a plan view of a facet disc which is rotated about an axis transverse to the plane of drawing. Again 2' is the beam which issues from the detector and which is focussed in point D. After reflection from the two faces 5 and 6 the image point D' is obtained, which travels in the direction indicated by the arrow 18 during rotation of the disc.

As a result of the small cross-sectional area of the beam 2' at the location of point D and hence that of the scanning beam coming from the left, a scratch or pit in the surface 5 or a dust particle on this surface will reduce the intensity of the radiation beam which issues from the object space and is ultimately incident on the detector. When a thermal scene is scanned a surface defect has the additonal disadvantage that it also emits infrared radiation to the detector, resulting in an addtional disturbance of the detector signal. In the case of surface defects the electrical signal supplied by the detector will no longer be a faithful reproduction of the scene or the object being scanned.

Figure 5:
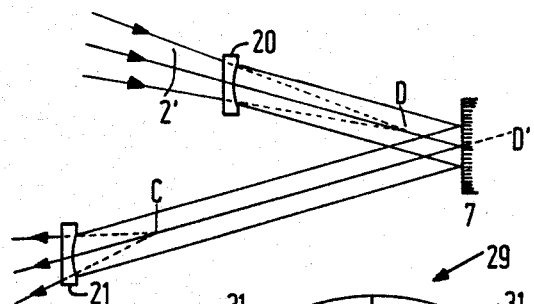

In accordance with the invention, in order to reduce the adverse effect of surface defects, the beam is widened at the location of the facet disc in a direction transverse to the scanning direction, in the present example a direction parallel to the axis of rotation of the facet disc. For this purpose two additional elements 20 and 21 may be arranged in the radiation path, as is shown in FIGS. 4 and 5. FIG. 5 shows the same elements of the scanning device as FIG. 4, but now in side view or in a vertical sectional view. The elements 20 and 21 may comprise plano-concave or plano-convex cylindrical lenses which only provide lens power in a direction perpendicular to the scanning direction 18. In the scanning direction these lenses do not influence the convergence of the beam. In the direction transverse to the scanning direction the lens 20 changes the convergence of the beam 2', this lens converting the beam, for example, into a parallel beam. After it has been reflected by a facet mirror the parallel beam is restored into a beam which diverges towards the object space by the lens 21.

The advantage of a parallel beam is that viewed in the direction of the beam axis or the optical axis of the device the two lenses 20 and 21 need not be positioned accurately relative to one another. Alternatively, the lens 20 may convert a strongly convergent beam into a beam of which converges less strongly and the lens 21 may convert a slightly divergent beam issuing from the facet mirror into a beam which diverges more strongly. Another possibility is that the lens 20 focusses the beam 2' in a plane which is situated comparatively close to this lens, so that this beam diverges after this point, and that the lens 21 restores the original divergence.

Stated in general terms, the elements 20 and 21 should be elements having an astigmatic effect, i.e. elements which change the convergence of the beam in a direction transverse to the scanning direction and, in principle, do not affect the convergence in the scanning direction.

Instead of by means of astigmatic elements specially provided for the purpose, the invention can also be realised by making elements already present in the radiation path astigmatic. For example, in the radiation path of a scanning device plane mirrors may be arranged before and after the reflector body 3 to fold the radiation path in order to reduce the length of the device, whilst the optical path length is maintained. In accordance with the invention the plane mirrors may be replaced by spherical mirrors which, because they are disposed obliquely in the beam, have an astigmatic effect. It is alternatively possible to make an element of the imaging system 9 astigmatic, which is also possible with, for example, an element of the objective system 1.

Figure 9:
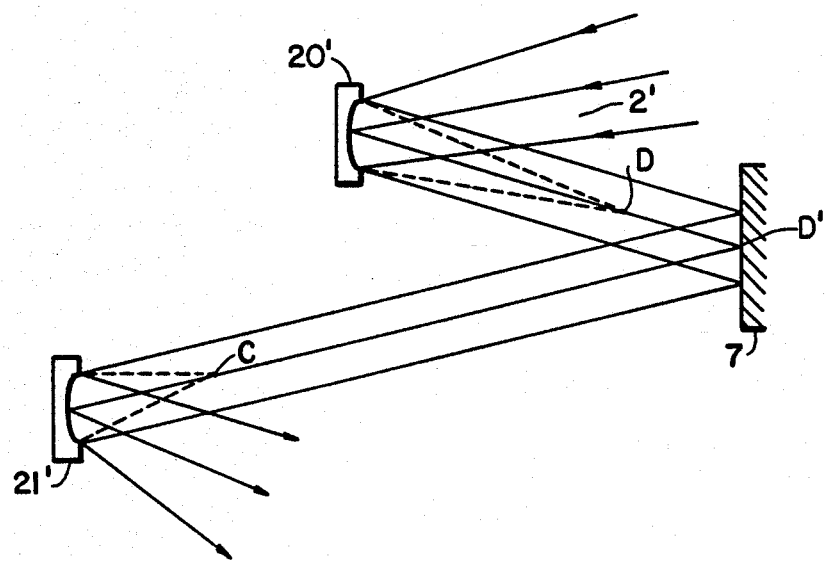

Instead of cylindrical lenses it is possible to employ cylindrical mirrors 20' and 21' as astigmatic elements, as shown in FIG. 9. These mirrors may comprise, for example, said folding mirrors, which should then be made cylindrical.

In the foregoing embodiments the scanning devices comprise cylindrical lenses or mirrors which defocus the scanning beam on a direction transverse to the scanning direction, for which purpose the cylinder axis of this lens or mirror extends transversely of the scanning direction. However, it is alternativly possible to select the power of the cylindrical lens or mirror and those of the other imaging elements, such as the objective 1 and the lens 3, in such a way that in the scanning direction the objective and the cylinderical lens or mirror together focus the scanning beam in a point in the proximity of a reflecting surface of the reflector element 3. The scanning beam is then out of focus in the direction transverse to the scanning direction. The cylinder axis of the cylindrical lens or mirror then extends parallel to the scanning direction.

As is shown in FIGS. 4 and 5, the powers and positions of lenses 20 and 21 may be selected in such a way that viewed in vertical plane of FIG. 5 the beam appears to issue from another point, point C, than in the horizontal plane of FIG. 4, point D', so that in the horizontal plane the beam has a different aperture angle than in the vertical plane.

In this way an anamorphic system is obtained by means of elements intended for rendering the scanning device immune to surface defects of the reflector body 3. Such a system is desirable, for example, if a radiation spot is to be imaged on the detection system 10 with different magnifications in two mutually perpendicular directions, horizontally and vertically. For example, it may be desirablee to magnify the radiation spot on the detection system in the scanning direction in order to obtain a faster scanning, whilst in the second direction the magnification is smaller and is defined by the geometry of the detection system of the system comprises a detector array. Obviously, the elements 20 and 21 may also form a non-anamorphic system.

Figure 6:
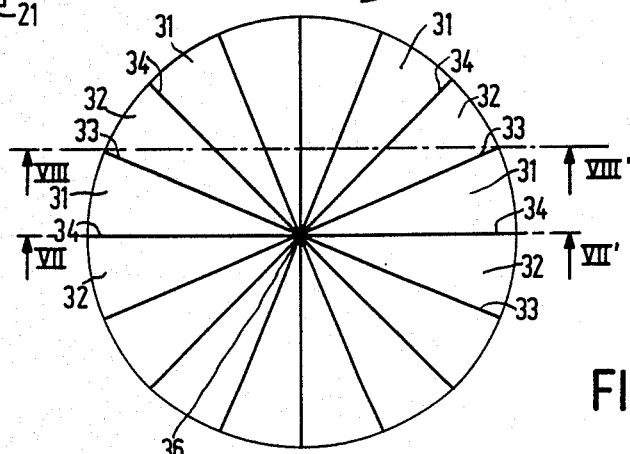
FIGS. 6, 7 and 8 show another facet disc in a plan view and two sectional views.
Figure 7:
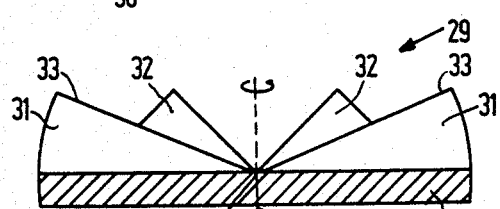
Figure 8:
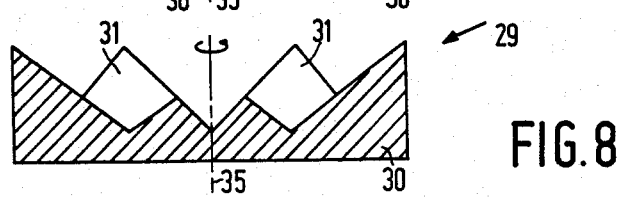

The invention may also be employd in a scanning device in which a flat facet disc is employd whose facet elements are not situated on the circumference but on the flat surface of the disc. FIG. 6 is a plan view of such a disc, whilst FIGS. 7 and 8 are sectional views of this disc taken on the lines VII—VII' and VIII—VIII' in FIG. 6. The flat facet disc 29 comprises a cylindrical support 30 provided with a number of facet elements each comprising two reflecting plane faces 31 and 32 an upper intersection line 33 and a lower intersection line 34. The two faces of a facet element intersect each other at an angle of substantially 90°. The disc 29 is rotated about an axis 35 and effects scanning in the same way as the facet drum 3 shown in FIGS. 1, 2, 3, 4 and 5. The radius of curvature of the scanning line of the flat scanning disc is infinite. The length of this scanning line, the line SL in FIGS. 1 and 3, is twice the distance between two facet elements.

By means of the flat facet disc different scanning distances, i.e. different lengths of the scanning line, can be obtained because the distance between two facet elements depends on the distance between the chief ray of the scanning beam and the centre 3 of the disc. By displacing the disc in a radial direction relative to the scanning beam length of the scanning line can be varied. When the invention is utilized in a scanning device comprising a flat facet disc 29, a radiation spot which is elongate in the direction of the intersection lines 33 or 34 is projected onto a reflecting surface 31 or 32 of this disc.

The scanning device in accordance with the invention may form part of a thermal image camera in which the scanning beam is a beam of infrared radiation and the electrical signal which is supplied by the detection system, which is now an infrared system, is employed for forming, for example, by means of a television display tube, a visible image corresponding to the thermal image being scanned. A visible image can also be obtained by means of a scanning device similar to that described in the foregoing. The scanning device for the formation of the visible image may form part of the apparatus comprising the infrared scanning device. A single facet disc may then be employed both for scanning the thermal image and for forming the visible image. It is alternatively possible to transmit the signal produced by the infrared detection system to a remote location where it is displayed.

A scanning device in accordance with the invention may also be utilized in systems which operate exclusively with visible light, such as facsimile apparatus, both for scanning the picture information to be transmitted and for displaying this information. In general, the invention can be utilized in any scanning device in which a scanning beam is focussed on a moving reflector.

What is claimed is:

1. An optical scanning device comprising an objective system, a rotationally symmetrical rotating reflector body comprising a plurality of reflector elements each comprising two plane reflector faces which are disposed at an angle of substantially 90° to one another and which intersect each other along a line transverse to the direction of rotation of the reflector body, a radiation-sensitive detection system arranged in the path of the radiation reflected by the reflector body, and an image system arranged between the detection system and the reflector body for imaging a point of the detection system and a fixed point in the proximity of the reflector body onto one another, characterized in that a first astigmatic element is aranged in a radiation path between the detection system and the reflector body and a second astigmatic element is arranged in a radiation path between the reflector body and the objective system to correct for the astigmatism of the first astigmatic element.

2. An optical scanning device as claimed in claim 1, characterized in that the first and second astigmatic elements each comprises a cylindrical lens whose cylinder axis extends transversely of the scanning direction.

3. An optical scanning device as claimed in claim 1, characterized in that the first and the second astigmatic elements each comprise a cylindrical lens whose cylinder axis extends parallel to the scanning direction.

4. An optical scanning device as claimed in claim 1 characterized in that the first and the second astigmatic elements each comprise a cylindrical mirror whose cylinder axis extends transversely of the scanning direction.

5. An optical scanning device as claimed in claim 1, characterized in that the first and the second astigmatic element each comprise a cylindrical mirror whose cylinder axis extends parallel to the scanning direction.

6. An optical scanning device as claimed in claim 1, characterized in that the positions and powers of the two astigmatic elements are such that between these elements the beam is a parallel beam, viewed in a direction transverse to the scanning direction.

7. An optical scanning device comprising:
   an objective system arranged in a radiation path to receive radiation from a scene;
   a rotationally symmetric reflector body arranged in the radiation path to receive scene radiation from the objective system, said reflector body being arranged to rotate around a first axis in a scan direction, said reflector element comprising a plurality of reflector elements, each reflector element comprising two planar reflector faces arranged at an angle of substantially 90° with respect to one another;
   a radiation-sensitive detector arranged in the radiation path to receive scene radiation from the reflector body; and
   an image system arranged in the radiation path between the detector and the reflector body;
   characterized in that:
   the image system comprises a first astigmatic element having an astigmatism; and
   the objective system comprises a second astigmatic element to correct for the astigmatism of the first astigmatic element.

8. An optical scanning device as claimed in claim 7, characterized in that at least one astigmatic element comprises a cylindrical lens having a cylinder axis, the cylinder axis being arranged transverse to the scanning direction.

9. An optical scanning device as claimed in claim 7, characterized in that at least one astigmatic element comprises a cylindrical lens having a cylinder axis, the cylinder axis being arranged parallel to the scanning direction.

10. An optical scanning device as claimed in claim 7, characterized in that at least one astigmatic element comprises a cylindrical mirror having a cylinder axis, the cylinder axis being arranged transverse to the scanning direction.

11. An optical scanning device as claimed in claim 7, characterized in that at least one astigmatic element comprises a cylinderical mirror having a cylinder axis, the cylinder axis being arranged parallel to the scanning direction.

12. An optical scanning device as claimed in claim 7, characterized in that the image system comprises means for collimating radiation from a point on the detector, said radiation being collimated in a direction transverse to the scanning direction between the detector and the reflector body.

13. An optical scanning device as claimed in claim 7, characterized in that the objective system comprises means for collimating radiation from a point in the scene, said radiation being collimated in a direction transverse to the scanning direction between the objective system and the reflector body.

* * * * *